Sept. 9, 1969  G. E. HUMMELSHØJ  3,465,396
PLANT FOR MANUFACTURING LARGE SLAB-SHAPED
CONSTRUCTIONAL ELEMENTS
Filed Sept. 26, 1966  2 Sheets-Sheet 1

3,465,396
PLANT FOR MANUFACTURING LARGE SLAB-
SHAPED CONSTRUCTIONAL ELEMENTS
Gustav E. Hummelshøj, Bagsverd, Denmark, assignor of
fifty percent to Thomas Schmidt, Bagsverd, Denmark
Filed Sept. 26, 1966, Ser. No. 581,928
Claims priority, application Denmark, Oct. 1, 1965,
5,073/65
Int. Cl. B28b 15/00
U.S. Cl. 25—2      8 Claims

ABSTRACT OF THE DISCLOSURE

A plant for manufacturing large molded articles comprising a track for supporting and advancing a battery, formed by a plurality of verticle partitioning plates and intermediate side boundary walls clamped together, from an assembling station to a disassembling station, means to fill the cavities formed between the plates, and means to return the partitioning plates and side boundary walls, after release at the disassembling station, to the assembling station.

---

Figure 1:
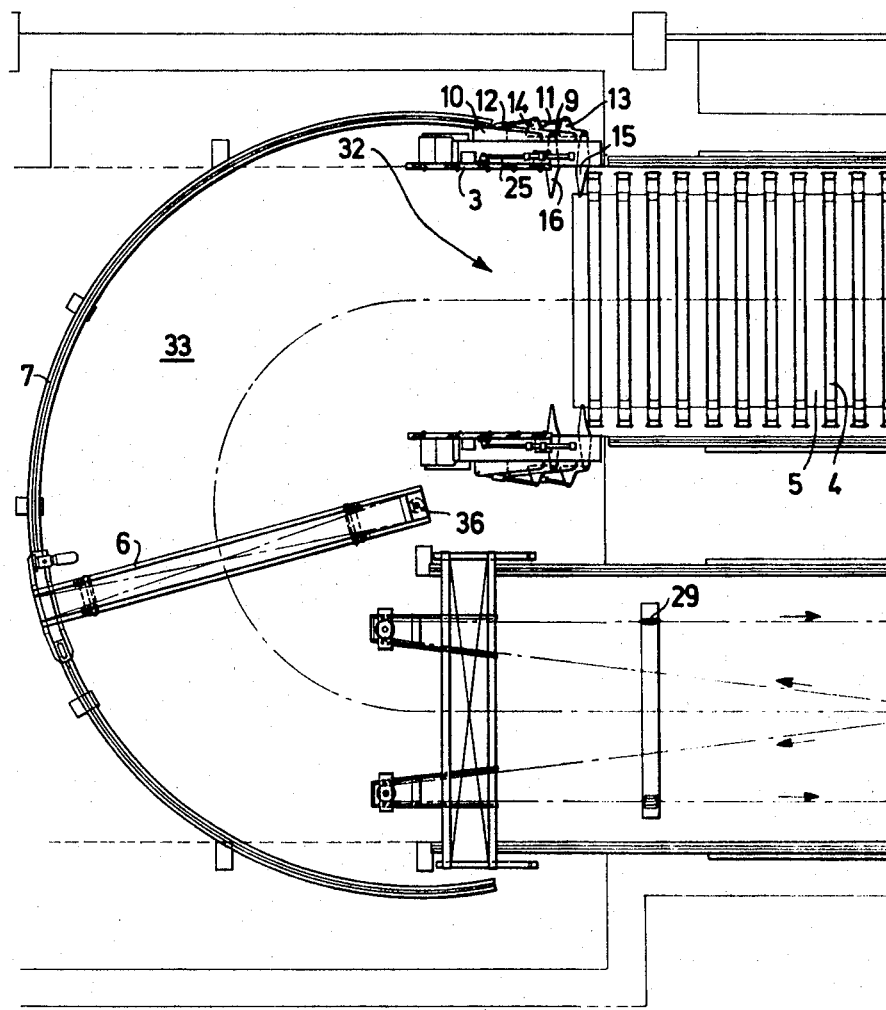
Figure 1A:
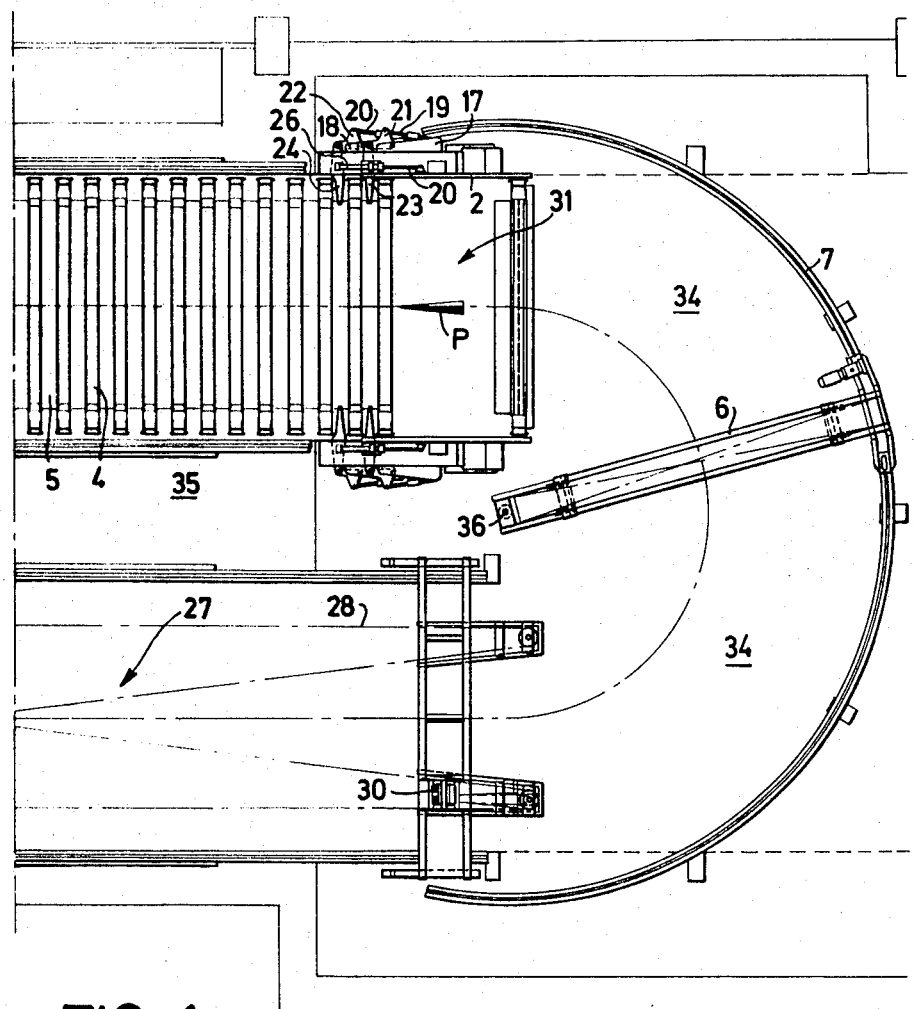

The present invention relates to the manufacture of subtantially plate-shaped or slab-shaped constructional elements of large dimensions, particularly wall elements, but also elements for floors and horizontal partitions, of concrete or other plastic, setting masses.

More precisely defined, the invention relates to the manufacturing technique where the elements are poured in a vertical position in batteries formed by a series of partitioning plates assembled and locked together with a series of bottom and side boundary members in such a way that when concrete or some other plastic mass is poured into the cavities thus provided, the assembled structure can resist the hydraulic pressure from the said mass in addition to stresses deriving from ramming or vibration, if any.

In a known plant for this manufacture, the bottom boundary members for several elements consists of a common bottom plate which forms a fixed plane, while the side boundary members are placed on plane tables which are mounted at right angles to the bottom plate and which can move laterally when stripping the battery. The side boundary members are placed on the said plane tables in such a way that partitioning plates consisting of steel frames with side plates mounted thereon can be mounted between the side boundary members, so that when the whole structure is closed the various components will be interlocked. When this battery is disassembled after pouring and setting, all the partitioning plates are raised by means of a crane and put in racks so that they can later be cleaned and re-assembled into a battery. Such a plant operates discontinuously in the way that the total battery, which may consist of 8–12 pouring chambers or more, is assembled and poured, after which it is left for setting for some hours and then disassembled, whereupon the set elements are removed, the battery cleaned and re-assembled for another pouring.

Such plants may comprise a number of such batteries which have a common pouring machine of a suitable design and a common crane unit, and various heating and service plants may also be common to them.

In another known plant the wall batteries consist in part of partitioning plates, in part of cell moulds which are erected alternately in a row, the cell moulds and the partitioning plates being movable by means of running wheels or slide shoes on a carrying construction, while the battery is held together by a hydraulic or mechanical clamping acting perpendicularly to the planes of the partitioning plates. After pouring and setting the battery is disassembled by the cell moulds and the partitioning plates being pulled so far from each other in the longitudinal direction of the battery that room will be provided for lifting the set concrete elements clear and for cleaning the partitioning plates and the cell moulds before the battery is re-assembled.

Also in this case a discontinuous method of operation is involved which may be carried out with several batteries in a single plant and with a common pouring machine, crane unit, conveyor plant etc.

It is a drawback of these known plants and of the method according to which they are operated, that the process is discontinuous, as in this way an intense manual work is required in certain periods, while at other times, while the poured elements are setting, practically speaking no manual work is to be performed. It will often be necessary to work in shifts or with prolonged or staggered working hours, the setting times often making it impossible to complete a full working cycle or a full number of complete working cycles within the normal working hours.

The invention first and foremost aims at providing a method for the manufacture of large slab-shaped constructional elements of concrete or other plastic, setting masses, by which method the elements are poured and set in mould cavities between vertical partitioning plates clamped together with intermediate side boundary walls into battery, enabling a completely continuous manufacturing process to be performed, with the whole battery in a "stationary" state, so that during a period of some minutes all the working steps are completed and one or more set elements issue after each period, while correspondingly one or more mould cavities are being poured.

According to the invention this is achieved by providing for the battery to extend between an assembling station and a disassembling station and to be held constantly clamped together while being slowly advanced between the former and the latter station, partitioning plates and side boundary walls being constantly added at one end of the battery at the assembling station with successive pouring of the mould cavities formed hereby, and being constantly removed from the other end of the battery under successive removal of the set elements at the disassembling station.

In this manner, a completely continuous manufacturing process is attained with an even distribution of necessary manual work over the full working time, so that the process can be carried out with a minimum of manual labour and with a continuous and evenly distributed employment of the matter. The plant can be stopped at any time and be left to itself, whereupon the manufacturing process can be resumed immediately at any other later time desired, so that the plant can without difficulties of any kind be operated during the normal working hours and be idle the rest of the time, or it may be operated for any longer periods desired with shorter intervals, or it may be operated continuously. During the operation of the plant, the pouring as well as the removal of the set elements are performed evenly and continuously, so that the machinery used for these purposes works evenly during constant full utilization, so that it need not be dimensioned to the heavy short performances with long intermediate periods of idling characteristic of discontinuous operation.

When the method is carried out in practice, there may expediently according to the invention be used bottom and side boundary members formed by cell moulds which are designed as upwardly open frames, whereby special measures for providing a bottom in the mould cavities are made superfluous.

By the successive removal of partitioning plates and side boundary walls at the disassembling station the set element is released from the mould cavity to such a degree that according to the invention there may expediently be used profiled partitioning plates provided with projections or recesses or both on one or both of the side faces facing the mould cavities, and hereby one attains great freedom with regard to the constructional design of the elements, the form of which is not bound by the regard to providing draft in a certain direction of withdrawal falling in the plane of the element.

According to the invention there may expediently be used partitioning plates with means for promoting the setting of the mass poured, e.g. members for heating electrically or in some other way, resulting in a reduction of the setting time spent and thereby a reduction of the necessary length of the battery.

The invention also comprises a plant for carrying out the new manufacturing method, the said plant being according to the invention characterized in that it consists of a track for supporting and advancing a battery of vertical partitioning plates with intermediate side boundary walls in the clamped state from an assembling station to a disassembling station with means for the successive pouring of the mould cavities formed between the partitioning plate at the assembling station, and with means for the successive return of the partitioning plates and side boundary walls, released at the disassembling station, to the assembling station. Such a plant is distinguished by a compact design with a smooth and continuous mode of operation as explained in connection with the above description of the new method according to the invention.

In an expedient embodiment of the plant according to the invention the return path for the partitioning plates and the side boundary walls may be formed by a rectilinear section extending parallel to and being of substantially the same extent as the direction of advance of the battery and being connected to the latter by two semi-circular transition sections, each of which is provided by means of a carriage pivotable 180° about a vertical axis and arranged for holding one or a few partitioning plates with associated side boundary walls at a time. In this manner a simple and well-planned arrangement is obtained with simple transport facilities for the components and occupying a minimum of space.

Furthermore, in accordance with an advantageous embodiment of the invention in such a plant, one or both of the transition sections may comprise stations for carrying out necessary operations on the partitioning plates and the side boundary walls, such as cleaning and oiling, and for performing further preliminary operations, such as the placing of reinforcement and the mounting of piping and wiring, cores, and inserts intended for being cast into the elements. By arranging these treatment stations in the semi-circular transition sections in the tracks free access to both sides of the partitioning plates is obtained, the latter being during the transition opened widely in relation to each other.

In an expedient embodiment of a plant according to the invention there are in the straight section of the return path inserted an assembling station and a disassembling station similar to those provided in the battery section proper, so that the straight section of the return path will also serve as a battery section, and hereby the plant will comprise two batteries located parallel to each other, in which the clamped partitioning plates and side boundary walls are slowly moved in opposite directions. Hereby a doubling of the capacity of the plant is achieved without any increase of space being needed.

The partitioning plates may expediently according to the invention together with side boundary walls in the form of upwardly open frames be suspended from suitable rails located preferably at the level of a floor or a platform for operators, by which means pouring and vibration, if any, and subsequent surface smoothing of the poured mould cavities will be easy to perform or supervise.

The necessary clamping together and advance of the battery may expediently according to the invention be effected by pins or bolts provided at each assembling and disassembling station and directed transversely to the direction of travel of the battery with means for engaging them into corresponding recesses in the partitioning plates and mounted on carriages which are displaceable in the direction of travel of the battery. With such a set of pins or bolts placed at each corner of the slab-shaped partitioning plates an even and uniform compression and advance of the battery is obtained by means which are of simple design and may easily be brought to engage and disengage the partitioning plates and which do not hamper the successive assembling and disassembling of the battery.

The said pins or bolts may expediently according to the invention at both stations be arranged and controlled in such a way in two groups that by being alternately inserted and withdrawn and alternately advanced and withdrawn in the direction of travel of the battery they cause an advance of the battery while maintaining the clamping together of the latter, while at the same time they permit a successive addition and removal of one or a few partitioning plates with associated side boundary walls at a time.

In the case of prolonged or continous operation of the plant it may occur that small inaccuracies sum up during the constant circulation of the partitioning plates and the side boundary walls, and to prevent inaccuracies in the elements manufactured it is therefore necessary at intervals to perform an alignment of the battery. With a view to this, there may expediently according to the invention in at least one place of the path of travel of the battery be incorporated a measuring plane for controlling the orientation of the passing partitioning plates, while at intervals special partitioning plates are inserted provided with adjustable thrust pads at different points of the circumference, by which means their orientation in relation to the adjacent plates and thereby to the direction of travel of the battery can be corrected on the basis of the control made in the measuring plane.

The invention is illustrated in the accompanying drawing which diagrammatically and with some components omitted shows a plan view of a plant according to an embodiment of the invention.

In a supporting structure not further shown, which may for example be formed by the stationary parts of a manufacturing shop, stationary running rails are mounted which e.g. may be located approximately at the level of the floor of the shop and from which there are from running wheels alternately suspended partitioning plates 5 and cell moulds 4, the latter in the form of rectangular upwardly open frames. The partitioning plates and the cell moulds thus hang down into a basement located below the floor of the manufacturing shop and may while running on the said rails and wheels traverse two rectilinear sections disposed parallel to each other, between which they are transferred by means of transfer carriages 6 which can swing 180° around vertical axes 36 and with their outwards-facing ends running on semi-circular rails 7.

In the embodiment shown, one of the said rectilinear sections, which is traversed in the direction indicated by an arrow P, forms the battery of the plant, the said battery being at the inlet end provided with an assembling station 31 and at the outlet end with a disassembling station 32.

At the disassembling station there are at both sides of the battery two pairs of carriages 9 and 10 mounted above and below, respectively. The two carriages in each pair are by means of hydraulic cylinders, not shown, reciprocable in the direction of travel of the battery, and each is provided with a pin or bolt 15 and 16, respectively, which by means of a bell-crank level 13 and 14, respectively, and a hydraulic jack 11 and 12, respectively, can be brought into and out of engagement with corresponding recesses in the partitioning plates 5. It will be obvious that by means of this arrangement it is possible to lock the outermost partitioning plate in the battery which hereby forms an abutment for the longitudinal compression of the battery, and at desired intervals to move this locking to the last partitioning plate but one in the battery, release the last partitioning plate with its associated cell mould 5, and next, while maintaining the compression, to let the whole battery move one pitch in the direction of travel. The further design of the hydraulic control members necessary for this purpose need not to be described in detail.

At the disassembling station 32 there are furthermore at either side provided a set of reciprocable rails 3 with a number of pawls. These rails are operated by hydraulic jacks 25 and serve for after the release of the last partitioning plate in the battery pulling the said partitioning plate forwards in the direction of travel clear of the battery, so that the mould cavity is opened and the set element released.

The assembling station 31 comprises a similar arrangement of bolts or pins 23 and 24 with associated bell-crank levers 21 and 22, hydraulic jacks 19 and 20, displaceable rails 2 with pawls, and hydraulic jacks 26 for operating the latter.

It will be obvious that a partitioning plate with associated cell mould placed at the beginning of the assembling station may by means of this arrangement be added to the right end of the battery, be pressed firmly against the latter and thereby push the whole battery forwards in the direction towards the disassembling station.

At a suitable point in the vicinity of the right end of the battery a pouring of the mould cavity just formed is performed, and this pouring may be effected from a crane filler bucket or by means of a special pouring machine, preferably with a simultaneous vibration of the concrete poured, e.g. by means of immersion vibrators which are from above led down into the mould cavity and withdrawn as the latter is being gradually filled. After the pouring, a smoothing of the free surface in the mould cavity is performed, and this can be done mechanically or manually.

The mould cavities poured now travel slowly—continuously or intermittently—forwards towards the disassembling station 32 while the necessary clamping pressure is still being maintained. This travel takes a few hours dependent on the setting time of the plastic mass poured. The setting may be accelerated by the partitioning plates being arranged for supplying heat to the mass poured, e.g. by electrical heating means or some other heating means.

At the disassembling station the mould cavities are, as mentioned above, opened by the outermost partitioning plate being pulled away in the direction of travel of the battery, so that the element is released and can be raised, the side boundary walls giving way of their own accord if on the latter there are projections or recesses for the formation of recesses in or projections on the edges of the elements. Due to the special opening of the mould cavities it is possible to use partitioning plates with projections on or recesses in the side faces without the removal of the finshed elements being made difficult. The released element is lifted and carried away by means of a crane and may via a special conveyor be led to after-setting or after-treatment.

The cell mould and partitioning plate released are by means of the pawl mechanism 3 moved to the swing carriage 6 mentioned above, which during this procedure is in a position directly at the left end of the disassembling station 32. As soon as the partitioning plate and the associated cell mould have been transferred to the swing carriage, the latter is swung around the axis 36, and hereby the partitioning plate and the cell mould become freely accessible and can be subjected to a cleaning during the swinging movement or while the swing carriage is temporarily stopped in a working position 33 serving for this purpose.

At the termination of its swinging movement of 180° the swing carriage delivers its contents to a conveyor 27 which returns the partitioning plate and the cell mould, standing on or hanging from running rails, along the battery by means of a chain drive which is operated by an electric motor 30 and is provided with suitable driving members 29. At the other end of the conveyor 27 the partitioning plate and the cell mould are taken over by the other swing carriage 6, when the latter is in a position in line with the end of the conveyor, and are then correspondingly swung over into a position in line with the beginning of the assembling station. During this swinging movement the swing carriage with the partitioning plate and the cell mould passes through working stations 34 at which various preliminary operations can be performed, such as cleaning and oiling, the placing of reinforcement, the mounting of electric installations, the insertion of cores and inserts for being cast in, the insertion of door jambs or window frames for being cast into the element, etc. The swing carriage can be stopped at these working stations or pass suitably slowly through them.

Certain preliminary works of those mentioned here may, however, also be performed at the assembling station 31 proper or after the partitioning plate and the cell mould have been added to the right end of the battery immediately before the pouring of the mould cavity. This applies in particular to the insertion of reinforcement.

The width of the partitioning plates and the associated cell moulds corresponds to the maximum length of the elements to be manufactured, while the height will normally correspond to the height of a storey in the case of wall elements. With a view to the manufacture of elements of varying widths corresponding to different modules the cell moulds may have adjustable side boundary members. In the case of very wide cell moulds, intermediate partitioning plates may also be mounted, so that two or more uniform or different elements are poured side by side in the same space between two consecutive partitioning plates.

The operation of the total plant is expediently controlled electrically so that the insertion and removal of cell moulds and partitioning plates in the battery, the transport of the assembled battery, the transport of the individual partitioning plates and cell moulds by conveyor and swing carriage are performed partly or fully automatically. The pouring may likewise be performed automatically or be performed by means of a pouring machine requiring only a single operator. Manual labour is only required for the cleaning of the partitioning plates and the cell moulds, the oiling of the latter, and the insertion of the various components, which however, may also to a wide extent be made automatic. The whole process can therefore be carried out with a minimum of manual labour which is employed evenly and constantly, the labourers having fixed places of work.

Due to the continuous working process, which entails that no work is accumulated, and due to the fact that the lifting of partitioning plates and cell moulds is made quite superfluous, the crane work is of a considerable smaller extent than was formerly the case, by which means the costs of the plant and its operation per element manufactured become as small as possible.

The example shown makes it obvious that it will be possible along the return section 27 to establish another manufacturing battery by there being simply established an assembling station corresponding to the station 31 at the beginning of the return section and a disassembling station corresponding to the station 32 at the termination of the return section, the cleaning, oiling, and the different other preliminary works being then performed similarly during the two swinging movements. Hereby a doubling of the manufacturing output is attained without any increase in space being required.

Between the two parallel sections a floor space or a platform 35 is provided where pouring machines may be stationed and from which an after-treatment and inspection can be performed.

The method and the plant according to the invention are first and foremost intended for being used in the manufacture of constructional elements of concrete, but may, as mentioned above, also be applied in the case of other plastic setting materials, e.g. plastics including foam plastics.

What I claim is:

1. A plant for casting large slab-like building elements comprising track means extending from an assembling station to a disassembling station, a plurality of alternate vertical partitioning plates and mold frames forming a battery, said battery being mounted on said track extending between said assembling station and said disassembling station, means at said assembling station for exerting pressure on said plates and frames to advance the battery towards the disassembling station, means at the disassembling station for exerting yielding counter pressure against said advancing pressure, means along said track adjacent the assembling station for pouring prepared casting material successively into mold cavities formed between consecutive pairs of partitioning plates and their associated frames, means at the disassembling station for separating the outermost partitioning plate and mold frame from the battery and removing the cast slab, and means to return said plate and frame from the disassembling station to the assembling station.

2. A plant according to claim 1 in which said means for returning said plate and said frame comprises two carriage means mounted adjacent one side of said battery and pivotable about a vertical axis, one of said carriage means being located at the assembling station and the other at the disassembling station, a rectilinear return section parallel to and of equal length to said battery, each said carriage means being adapted to receive and deposit, respectively, at least one plate and one frame from and on said rectilinear section, and means to move said plates and frames along said section.

3. A plant according to claim 2 further comprising at least one station for performing operations on the partitioning plates and mold frames is arranged between said disassembling station and said return section.

4. A plant according to claim 2 further comprising at least one station for performing operations on the partitioning plates and mold frames is arranged between said return section and said assembling station.

5. A plant according to claim 2 further comprising an assembling station and a disassembling station respectively located at the beginning and end of said return section, pressure means and counter pressure means at said assembling and disassembling stations respectively to form a second battery on said return section.

6. A plant according to claim 1 wherein said partitioning plates and said mold frames are suspended from said track means, said pressure and counter pressure means each comprising a plurality of pins directed transversely to the direction of travel of the battery and carriage means supporting said pins and being reciprocatable in the direction of travel of the battery.

7. A plant according to claim 6 wherein said pins at each station are arranged in two independent groups, means for alternately engaging and disengaging the pins of each group with the associated partitioning plates, and means at the assembling station for advancing the engaged group of pins in the direction of battery travel, means at the disassembling station for allowing the engaged pins to yield under counter pressure to the advance or the battery.

8. A plant according to claim 1 further comprising at least one measuring plane adjacent the path of battery travel and adapted to control orientation of said partitioning plates in relation to the axis of battery movement adjustable pressure shoes on at least some of the partitioning plates, said shoes being controlled from said measuring plane.

References Cited

UNITED STATES PATENTS 2,226,966   12/1940   Cannon _____ 25—84 X

J. SPENCER OVERHOLSER, Primary Examiner

De WALDEN W. JONES, Assistant Examiner

U.S. Cl. X.R.

25—41